Jan. 17, 1961 J. E. QUARNSTROM 2,968,110

TELEPHONE SUPPORTING INDEX DEVICE

Filed Aug. 25, 1959 2 Sheets-Sheet 1

INVENTOR.

John E. Quarnstrom.

BY

Harold J. LeVesconte

Atty.

TELEPHONE SUPPORTING INDEX DEVICE

Filed Aug. 25, 1959 2 Sheets-Sheet 2

INVENTOR.
John E. Quarnstrom.
BY
Harold J. De Vicoute
Att'y.

2,968,110
Patented Jan. 17, 1961

2,968,110

TELEPHONE SUPPORTING INDEX DEVICE

John E. Quarnstrom, 1145A Winchester Ave., Glendale 1, Calif.

Filed Aug. 25, 1959, Ser. No. 835,896
10 Claims. (Cl. 40—336)

This invention relates to indexing devices and particularly to an improved form of selector key actuated index device used in conjunction with and as a support for a telephone instrument.

The principal object of the invention is to provide a telephone index means which serves as a support for the instrument and which by means of actuation of a desired one of a plurality of key elements brings into view in front of the instrument, a data sheet carrying a desired group of names and numbers or other desired information.

Another object of the invention is to provide a device of the above character in which the exposed record sheet is at all times in position for adding to or altering any data contained thereon.

Still another object of the invention is to provide an index device for use with telephone instruments comprising an instrument supporting frame having a latch retained, record carrying drawer means which is spring actuated to move forwardly out of the frame, and a plurality of selector keys, each effective to release the drawer retaining latch and individually effective to determine the one of a plurality of data sheets carried by said drawer to be exposed to the view of the user.

A further object of the invention is to provide a telephone index device in which all of the foregoing objectives are realized in practice, which is composed of parts susceptible of economical manufacture and assembly, which is simple in construction, and which is reliable in operation.

Figures 1, 2, 4, 13, 14:
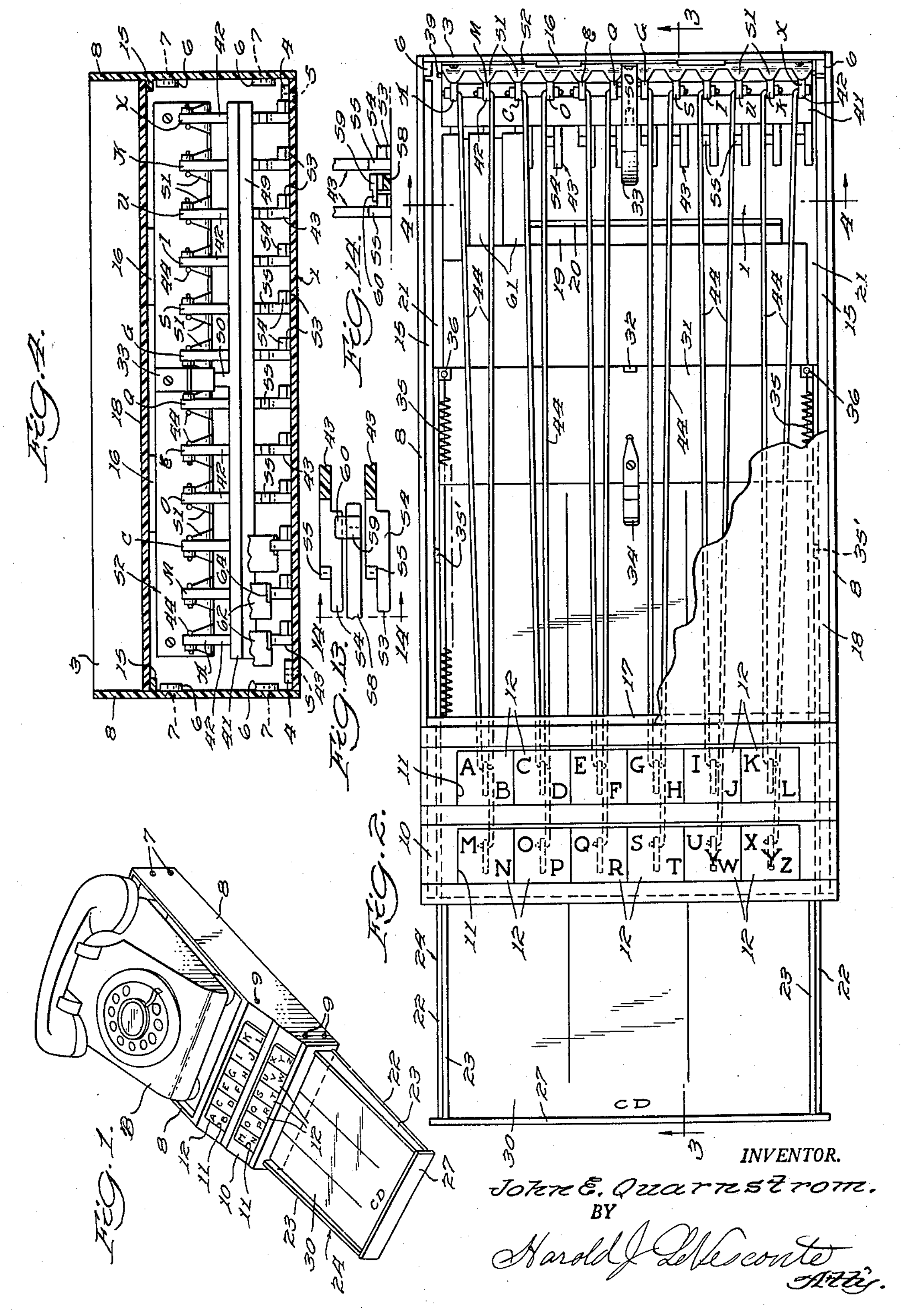
Figures 3, 5, 6, 7, 8, 9, 10, 11, 12:
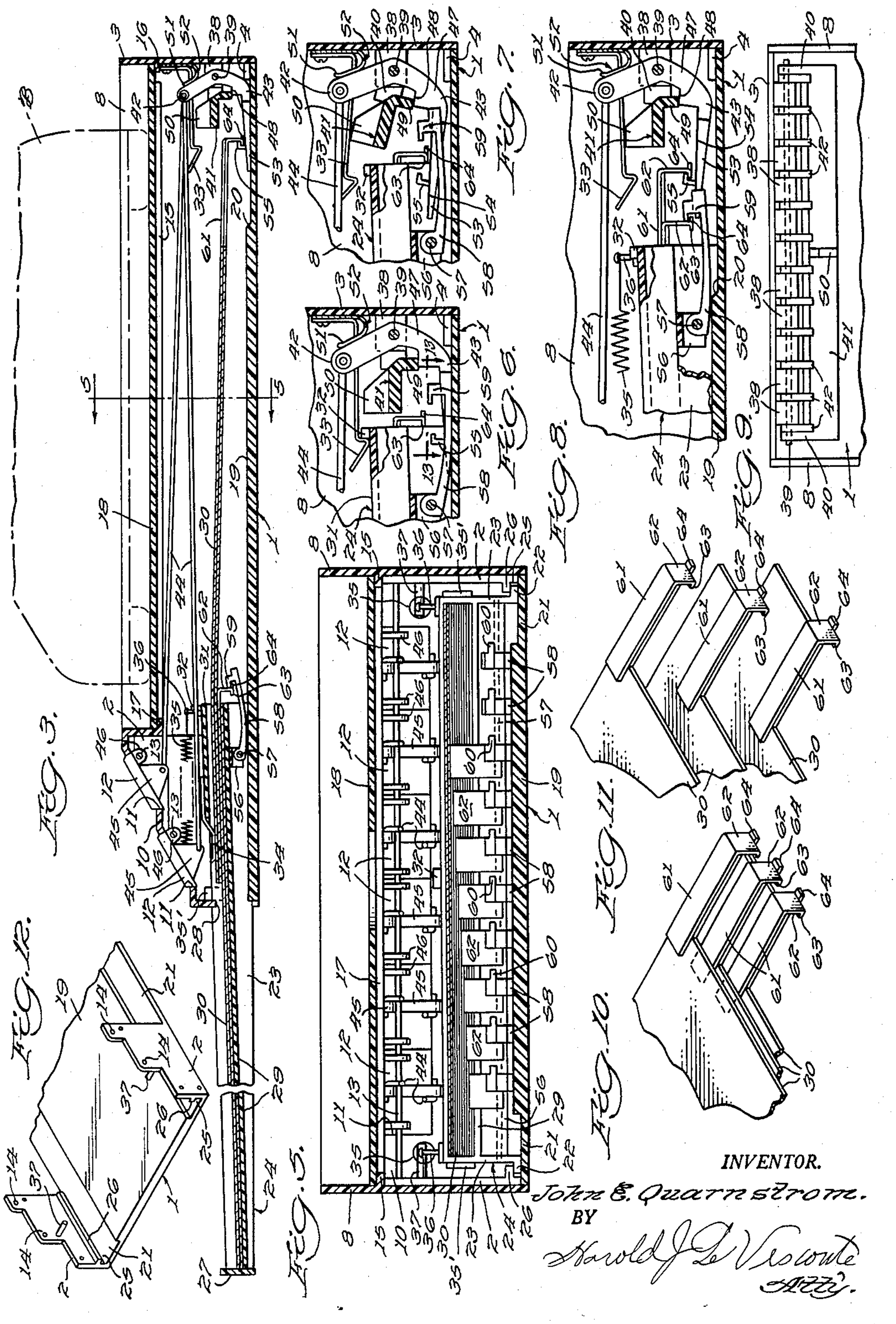

With the foregoing objects in view, together with such additional objects and advantages as may subsequently appear, the invention resides in the construction, combination and arrangement of parts described, by way of example, in the following specification of a presently preferred embodiment of the invention, reference being had to the accompanying drawings which form a part of said specification and in which drawings:

Fig. 1 is a small scale perspective view of a telephone index means embodying the present invention showing the drawer component thereof in partially open position and further showing the manner in which a telephone instrument is supported on the device, Fig. 2 is a top plan view of the device, the record carrying drawer being shown in partly open position and the portion of the frame structure upon which the telephone instrument rests being partially broken away to disclose construction thereunder, Fig. 3 is a longitudinal sectional view taken on the line 3, 3 of Fig. 2, the drawer being shown in fully opened position and a portion of the mid-length portion of the drawer being broken away to conserve space in the drawing while maintaining a scale adequate to show the parts of the device, Fig. 4 is an enlarged, transverse sectional view taken on the line 4, 4 of Fig. 2, Fig. 5 is an enlarged transverse sectional view taken on the line 5—5 of Fig. 3, Figs. 6, 7 and 8 are enlarged scale, fragmentary views showing the drawer and data sheet retaining and releasing means in drawer retaining, drawer releasing, and data sheet selecting positions, respectively, Fig. 9 is a top plan fragmentary view of the rear end of the device, the spring means for biasing the key actuating devices being omitted, Fig. 10 is a fragmentary perspective view of some of the data carrying sheets as they are stacked in the drawer, Fig. 11 is a view similar to Fig. 10 but showing the data sheets separated to illustrate the interengaging portions thereof, Fig. 12 is a fragmentary perspective view of the front end of the base portion of the frame structure.

Fig. 13 is a further enlarged fragmentary sectional view taken on the line 13—13 of Fig. 6, and Fig. 14 is a sectional view taken on the line 14—14 of Fig. 13.

Referring to the drawings, the illustrated embodiment of the invention comprises a box-like structure including a bottom member 1, having keyboard key supporting members 2, 2 formed integrally therewith and rising from the side edges at the forward end of the bottom member. Secured to the rear end of the bottom member 1 is a rear wall component 3 having forwardly projecting lugs 4, 4 at the lower inner face thereof which threadedly receive screws 5, 5 extending upwardly through the bottom member. The side edges of the member 3 carry pairs of forwardly projecting lugs 6, 6 and screws 7, 7 extend through the rear ends of sidewall members 8, 8 to secure said members to the member 3 by threaded engagement with the lugs 6, 6. The forward ends of the sidewall members 8, 8 extend along the outer faces of the bottom portion and against the outer faces of the portions 2, 2 of the bottom member 1 and are secured to said portions by screws 9, 9. Formed integrally with and extending between the forward end of the upper edges of the side members is a keyboard defining component 10 having parallel, laterally extending slots 11, 11 extending therethrough and in which slots the selector keys 12 are retained against lateral movement; said selector keys being pivotally mounted on rods 13, 13 mounted in holes 14, 14 in the members 2, 2 and retained against endwise movement therein by the overlying portions of the sidewall members 8, 8. These keys each operate separate trains of mechanism as will be later described in detail. The sidewall members 8, 8 on the inner faces thereof are provided with one each of a pair of longitudinally extending, parallel ledges 15, 15 disposed below the upper edge of the sidewall members and the rear end member 3 on the inner face thereof and the rear face of the keyboard defining component 10 are provided, respectively, with complementary ledges 16 and 17; all of said ledges serving to support a rigid cover member 18 resting thereon. The portions of the walls extending above the cover member 18 combine therewith to form a recessed top surface into which the base B of a telephone instrument may be placed. The bottom member 1 from the front end thereof is provided with a thickened portion 19 which terminates laterally inwardly of the sides and terminates in a sloping camming face 20 disposed forwardly of the front face of the rear wall 3, the function of said camming face to be later described in detail.

Slideably engaging the upper surface of the portions 21 of the bottom member 1 at the sides of the thickened portion 19 are the foot portions 22, 22 of the sides 23, 23 of a drawer 24, said foot portions projecting laterally outwardly beyond the sides of the drawer and engaging the grooves 25, 25 formed by the horizontal ribs 26, 26 on the portions of the bottom member 1 and the upper surface of the bottom member portions 21, 21. The sides 23, 23 are connected at their front ends by the drawer front member 27 which covers the opening 28 in the frame member 10 through which the drawer moves to open positon. The sides 23, 23 gradually increase in heighth from the front to the rear ends thereof and the drawer bottom 29 is disposed at a uniform distance from the top edges of the sides and combines therewith to form a receptacle space for the stack of rigid data bearing sheets 30 to which more detailed reference will be later made. The rear end of the drawer is open to allow relative movement between the sheets and the drawer incident to the operation of the device and the rear upper edges of the drawer sides 23, 23 are connected by a bridging member 31 which carries a detent element 32 positioned for engagement and disengagement with a spring latch member 33, and further carries a forwardly projecting leaf spring member 34 operative to press downwardly against the stack of data bearing sheets 30. Tension springs 35, 35 disposed at each side of the drawer and extending between pins 36, 36 at the rear end of the drawer and laterally extending pins 37, 37 projecting from the inner faces of the base portions 2, 2 constantly apply a bias to the drawer and upon release of the latch member 33 move the drawer to open position determined by engagement of the stops 35′, 35′ with the front endwall of the keyboard defining component 10 as shown in Fig. 3.

Approximately midway of its height, the inner face of the rear member 3 carries a horizontal row of lugs 38, laterally spaced from each other and through which a pivot rod 39 extends, the outermost of said lugs at each end thereof being spaced inwardly of the side edges of the member 3 and the rod 39 extending substantially to the inner faces of the sides 8, 8 of the frame structure to limit endwise movement thereof. Pivotally mounted on the extreme ends of the rod 39 and likewise held against movement endwise of the rod by the sides of the frame structure are the rearwardly extending arms 40, 40 of a latch releasing member 41, the function of which will be later described, it being sufficient for the moment to mention that the rear edge thereof between the arms 40, 40 is spaced forwardly of and extends generally parallel to the rod 39.

The juxtaposed faces of the arms 40, 40 and of the lugs 38 are spaced apart equal distances to receive betwene them the pivotal portions of a plurality of identical bellcrank members pivoted on the rod 39 and each of said bellcrank members including a vertically upwardly extending arm 42 and a generally horizontally extending arm 43 disposed adjacent to the bottom of the frame structure, there being as many of said bell cranks as there are operating keys. A series of rods 44 connect one each of the arms 42 with one each of the depending lugs 45 carried by the keys 12; said lugs being centrally disposed forwardly of the rod 13 upon which the key is mounted by its spaced depending lugs 46, 46, wherefore, pressing downwardly on the key will subject the rod 44 connected thereto to compression with resultant rocking of the bellcrank connected to the other end of the rod in a clockwise direction on the pivot rod 39 as viewed in Figs. 3, 6, 7 and 8. In the illustrated embodiment of the invention, in Figs. 2 and 4, the bellcranks associated with the individual keys have been indicated by letters corresponding to the first letter appearing on the various keys.

The arm 43 of each bellcrank includes a portion 47 extending generally diagonally downwardly and forwardly and on the front edge thereof is provided with a horizontal camming surface 48 which engages the depending ledge portion 49 of the latch releasing member 41, whereby upon depressing any one of the keys 12, the said rocking movement will also rock the member 41 about the rod 39 in the same direction. The upper surface of the member 41 carries an upwardly extending boss 50 disposed directly beneath the latch 33 in rear of its engagement with the lug or detent 32 on the drawer and consequently, as shown in Fig. 7, this rocking movement of the member 41 will lift the latch 33 clear of the detent 32, releasing the drawer to the bias of the springs 35, 35 which will then move it forwardly. When the pressure on the key is released, the resilience of the latch 33 will move the member 41 in the opposite direction and assist the spring fingers 51 of a leaf spring 52 attached to the inner face of the rear frame member and engaging the arms 42 of all of the bellcranks to restore the device to its position of repose. As will be noted in Fig. 3, the front edges of the keys in swinging about their pivots on the rods 13 engage the front edges of their respective slots 11 and thus limit the extent of the return movement deriving from the engagement of leaf springs 51 on the bellcranks.

The arm 43 of each bellcrank terminates in a tapered, forwardly extending end portion 53, which when the bellcrank is in its position of repose (see Fig. 3) lies on the upper surface of the bottom 1 in rear of the camming surface 20. When the key to which a bellcrank is depressed, in addition to releasing the latch 33, the movement of the bellcrank brings the upper face of this tapered portion 53 into at least substantially horizontal plane or into a plane which is slightly upwardly forwardly inclined as shown in Figs. 7 and 8. The distal ends of the portions 53 of the bellcranks include a laterally disposed camming surface portion 54 which is co-planar with the top surface of the portion 53 and each of said distal ends is further provided with a rearwardly facing hook 55 disposed in the longitudinally extending vertical plane containing the bellcrank except the camming surface 54 thereof.

The under surface of the drawer bottom 29 at the rear end thereof carries a member 56 having upwardly extending slots disposed at spaced intervals transversely of the drawer and further carrying a transversely extending pivot rod 57 extending across said slots and on which the forward ends of a plurality of rearwardly extending hook elements are pivotally mounted, there being one hook element for each bellcrank except the bellcrank associated with the lowermost data sheet, the said forward ends of said hook elements being disposed in the slots in the member 56 and each of said elements terminating at its opposite end in a forwardly facing hook 59 disposed rearwardly of the rear end of the drawer and also having, adjacent to said hook, a laterally extending lip or ledge 60 which overhangs the camming surface 54 of the bellcrank with which the hook is associated. As the bellcrank is rocked by actuation of its key, it lifts the rear end of the hook element 58 with which it is associated and since the drawer is released through the action of the springs 35, 35, the hook element 58 thus lifted remains lifted as it rides along the top of the camming surface 54 of the associated bellcrank. Before the movement of the drawer has moved the hook element beyond the distal end of the camming surface 54, the underside of the hook element 58 engages the camming surface 20 on the drawer bottom and thus is held in raised position during the remainder of the forward excursion of the drawer.

In the illustrated embodiment of the invention there are, of course, as many of the data sheets 30 as there are keys and sets of devices operated by the individual keys. Referring to Figs. 10 and 11, it will be noted that the rear end of the sheets as viewed in those figures and from the right hand end of Figs. 2 and 5, are arranged with the lowermost sheet terminating at the end of the drawer and that the succceeding sheets have rearwardly extending hook engaging members each comprising a rearwardly extending shank 61 and a downwardly extending portion 62; said downwardly extending portions being arranged in side by side relation and with all of the downwardly extending terminal portions thereof disposed in the same horizontal plane, which plane is above the horizontal plane of the hooks 55 and 59 when in repose, wherefore, the downwardly extending portions 62 of the uppermost sheets are slightly longer than those of the sheets below them. The portions 62 of each of these members at one side thereof have a forwardly extending projection 63 adapted to be engaged by the hook 55 of the bellcrank associated therewith and at the other side with a rearwardly extending projection adapted to be engaged by the hook 59 of the hook element 58 associated with the bellcrank.

In the drawings it is assumed that the key marked "CD" has been depressed, releasing the drawer retaining latch 33 and rocking the associated bellcrank to raise the hook 55 thereof into the path of the projection 64 on the sheet immediately above the sheet carrying the names and numbers on the "CD" sheet. This movement has also caused the camming surface 54 of that bellcrank to lift the hook member 58 engaged thereby so that the hook 59 thereof is in line with the projection 64 on the member 62 of the "CD" sheet. This momentary relation of the parts is shown in Fig. 7 in which both hook members are thus raised and the latch 33 has been lifted to release the drawer. The forward movement of the drawer by the springs 35, 35 causes the hook 59 to engage the projection 64 on the "CD" sheet and thus move it forward carrying all the sheets below with it by reason of all the members 58 having been lifted by the camming surface 20. The upper sheets have, of course, been retained by the engagement of the hook 55 with the projection 63 on the sheet immediately above the "CD" sheet. When the drawer is returned to the closed position, the retained sheets are held by engagement against the face of the latching bar and the sheets which have been moved out with the drawer slide back under the thus retained sheets. The leaf spring 34 serves to provide a slight friction between the various data sheets and also prevents any tendency for the rear end portions of the sheets to get out of position.

The foregoing explanation of a typical operation of the device is followed when each key is thus depressed except, of course, when the key which selects the top data sheet is depressed. Since in that situation there is no need to retain any sheet the sheet retaining hook on that particular bellcrank can of course be omitted. Also, since there is never any requirement for relative movement between the lowermost sheet and the drawer, that sheet is attached to the drawer and the hook element otherwise required omitted. Other than that, the pressing of each selector key will cause one hook to retain all of the data sheets above the one to be exposed and will cause the hook carried by the drawer to engage the sheet to be exposed and move it with the drawer with consequent simultaneously moving with the drawer all of the sheets below the sheet selected for exposure and viewing.

While in the foregoing specification there has been disclosed a presently preferred embodiment of the invention, it will be appreciated that such disclosure is by way of example and that it is not to be inferred therefrom that the invention is in any way limited to the precise disclosure thus given by way of example. Consequently, it will be understood that the invention includes as well all such changes and modification in the parts, and in the construction, combination and arrangement of parts as shall come within the purview of the appended claims.

I claim:

1. A telephone instrument support and index device comprising a box-like frame structure having a recessed top surface in which the base of the instrument is received, a front opening in said frame structure, a drawer slideably mounted in said frame and movable in a horizontal line to an open position through said front opening to expose the contents of said drawer to view, spring means constantly biasing said drawer to move to open position, latch means normally holding said drawer in closed position, a plurality of data bearing sheets stacked in said drawer, a plurality of manually operable keys mounted at the front end of said frame structure; there being a key for each of said sheets, means for releasing said drawer retaining latch, a plurality of trains of mechanisms, one for each of said keys, each of said trains of mechanisms being operable by the key associated therewith to actuate said latch releasing means and each of said trains of mechanism, additionally, being separately operable to restrain any of said sheets lying above the sheet associated with the actuated key from movement with the released drawer and to move the said associated sheet and any sheets lying between it and the drawer bottom out with the released drawer.

2. A telephone instrument support and index device as claimed in claim 1 in which said frame structure in front of said recessed top has a forwardly and downwardly extending keyboard portion and in which said keys are mounted disposed above said front opening for said drawer, and in which said key actuated trains of mechanism extend from said keys above said drawer to the rear end thereof and thence downwardly in rear of the rear end of said drawer.

3. A telephone instrument support and index device as claimed in claim 1 in which each of said key actuated trains of mechanism includes a spring yieldingly opposing manual actuation thereof, and in which the interengagement between a portion of each key and the portion of the frame structure adjacent thereto serves as a stop means to limit the action of said spring.

4. A telephone instrument support and index device as claimed in claim 1 in which each of said trains of mechanism includes a bell crank member pivotally mounted on the rear end of said frame structure and in which all of said bell crank members and said latch releasing means are mounted for pivotal movement on a single bearing member.

5. A telephone instrument support and index device as claimed in claim 1 in which each of said data bearing sheets which overlies another of said sheets includes a rigid member extending rearwardly of the sheet to which it is connected and in which all of said rigid members terminate in depending end portions disposed in side by side relation a uniform distance from the rear end of said frame structure when said drawer is secured by said latch means and with the ends of said members disposed parallel to each other and at a uniform distance above the bottom of said frame structure.

6. A telephone instrument support and index device comprising a box-like frame structure having a recessed top surface in which the base of the instrument is received, an opening in the front of said frame structure, a drawer slideably mounted in said frame and movable to open position through said opening, spring means constantly biasing said drawer to move to open position, latch means carried by the rear end of said frame structure engaging the rear end of said drawer and normally retaining said drawer in closed position, means for releasing said drawer retaining latch means, a plurality of manually operable keys pivotally mounted for movement about a horizontal axis at the front ends of said frame structure; there being a key for each of said sheets, a plurality of bell crank members one for each of said keys, pivotally mounted in laterally spaced relation for movement upon a horizontal rod carried by the rear end of said frame structure and each of said bellcrank members including a vertically upwardly extending arm connected to the associated one of said keys by a rod extending above and parallel to said drawer, and a downwardly and forwardly extending arm terminating in a rearwardly facing hook element disposed in a horizontal plane below the plane of the bottom of said drawer, a plurality of hook engaging elements carried one each by each of said data bearing sheets which overlies another of said data bearing sheets, said hook engaging elements being disposed in side by side relation in a line spaced from and extending parallel both to the rear end of said frame structure and the bottom of said frame structure, said latch releasing means being disposed adjacent to all of said downwardly and forwardly extending arms of said bellcranks and arranged for latch releasing actuation by any one of said bell cranks, and hook devices carried by said drawer and separately actuated by each of said bell cranks effective to engage the hook engaging means of the sheet associated with the key by which the bell crank is actuated and to move said sheet with the drawer when released by actuation of such bell crank.

7. A telephone instrument support and index device as claimed in claim 6 in which said drawer releasing latch means is mounted for rocking movement on the same rod as said bell cranks.

8. A telephone instrument support and index device as claimed in claim 6 in which the hook elements on each of said bell cranks is effective upon actuation by the key to which the bell crank is connected, to engage the hook engaging element of the sheet immediately overlying the sheet associated with the actuated key and to retain the engaged sheet and any sheets above it against movement with the released drawer.

9. A telephone instrument support and index device as claimed in claim 6 in which said bell cranks adjacent to the hook element thereof have a laterally projecting portion and in which the hook devices carried by said drawer comprise a pivot rod carried by said drawer below the data sheets supporting bottom thereof and extending transversely thereof forwardly of the rear end of said drawer, a plurality of hook elements, one for each of said bell cranks freely pivotally mounted on said pivot rod and having trailing distal ends disposed in rear of said drawer terminating in forwardly facing hooks adapted to engage a rearwardly projecting hook engaging element on the associated data bearing sheet and further having a laterally extending ledge overlying the lateral projection on the bell crank connected to the key associated with the data bearing sheet; said ledge engaging said lateral projection upon actuation of said bell crank, being effective to lift said forwardly facing hook into a horizontal plane containing the hook engaging element of the associated data bearing sheet.

10. A telephone instrument support and index device as claimed in claim 9 in which the inner bottom surface of said frame structure includes a camming surface engageable with the under surface of said hooks carried by said drawer effective, incident to forward movement of said drawer, to lift all of said hooks into the plane of the hook engaging elements of the data bearing sheets associated with the actuated key and all sheets underlying such associated sheet.

References Cited in the file of this patent

UNITED STATES PATENTS

| | | |
|---|---|---|
| 2,524,704 | Henderson | Oct. 3, 1950 |
| 2,536,544 | Gordenier | Jan. 2, 1951 |
| 2,568,819 | Olevin | Sept. 25, 1951 |

FOREIGN PATENTS

| | | |
|---|---|---|
| 965,755 | France | Feb. 22, 1950 |